United States Patent
Collins et al.

(10) Patent No.: US 12,316,827 B2
(45) Date of Patent: May 27, 2025

(54) ENHANCED AUDIOVISUAL SYNCHRONIZATION USING SYNTHESIZED NATURAL SIGNALS

(71) Applicant: Amazon Technologies, Inc., Seattle, WA (US)

(72) Inventors: Andrew Collins, Eversley (GB); Alexander Charles Mackin, Stonehouse (GB); Benoit Quentin Arthur Vallade, London (GB); David William Higham, Sheffield (GB); Erdem Durgut, London (GB)

(73) Assignee: Amazon Technologies, Inc., Seattle, WA (US)

(*) Notice: Subject to any disclaimer, the term of this patent is extended or adjusted under 35 U.S.C. 154(b) by 126 days.

(21) Appl. No.: 18/064,680

(22) Filed: Dec. 12, 2022

(65) Prior Publication Data
US 2024/0195949 A1    Jun. 13, 2024

(51) Int. Cl.
| | | |
|---|---|---|
| *H04N 17/00* | (2006.01) | |
| *H04N 5/272* | (2006.01) | |
| *H04N 5/28* | (2006.01) | |
| *H04N 21/218* | (2011.01) | |
| *H04N 21/242* | (2011.01) | |

(52) U.S. Cl.
CPC ............. *H04N 17/00* (2013.01); *H04N 5/272* (2013.01); *H04N 5/28* (2013.01); *H04N 21/21805* (2013.01); *H04N 21/242* (2013.01)

(58) Field of Classification Search
None
See application file for complete search history.

(56) References Cited

FOREIGN PATENT DOCUMENTS

| JP | 2003158643 A | * | 5/2003 |
|---|---|---|---|
| WO | 2021048065 A1 | | 3/2021 |

* cited by examiner

*Primary Examiner* — Hung Q Dang
(74) *Attorney, Agent, or Firm* — Eversheds Sutherland (US) LLP (57) ABSTRACT

Devices, systems, and methods are provided for receiving, by a first device, a first video feed from a first camera at a first televised event the first video feed comprising synthesized content preceding the first televised event, the synthesized content comprising a virtual representation of an object or being; detecting a first delay time between audio and video of the synthesized content in the first video feed; generating, based on the first delay time, video content comprising a first portion of the first video feed; and sending the video content to a second device for presentation of the televised event.

20 Claims, 7 Drawing Sheets

ENHANCED AUDIOVISUAL SYNCHRONIZATION USING SYNTHESIZED NATURAL SIGNALS

BACKGROUND

Detecting end-to-end audiovisual synchronization for video contribution systems from source cameras through production and contribution chains to end devices is a difficult system problem. For example, detecting that video of a talking head is not synchronized with the audio from the talking head may involve manually introducing an object to be captured by a camera and used to detect when the audio and video are not synchronized. A more efficient solution for detecting when audio and video are not synchronized prior to distributing content is desirable.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for enhanced audiovisual synchronization using synthesized natural signals.

Cameras may capture audio and video for television (e.g., a live stream using over-the-top or linear television), and prior to the audio and video content being distributed to user devices, audiovisual synchronization techniques may be used to detect when the audio and video are not synchronized. For example, the words spoken by a person may not be synchronized in time with the corresponding lip movements of the person. Audiovisual synchronization techniques may allow for detecting the lack of synchronization prior to providing the out-of-sync audio and video to user devices for presentation.

For example, audio and video captured by cameras (e.g., at a live sporting event) may be sent from the cameras to a broadcast truck outside of the stadium where the event occurs and processed prior to distributing the audio and video to user devices. Some existing synchronization techniques to measure the delay between audio and video signals is to use custom signal generators to insert specific signals that are easily detected and measured into the chain. For example, a device may synchronize the audio and video by correlating visual data patterns (e.g., presenting QR codes, test slates and audio chirps that may be captured by video/audio devices and used to detect whether they are present at the correct time). Instead of sending the actual audio and video signals captured by the cameras through the signal chain, visual data patterns may be sent through the signal chain. Knowing the temporal characteristics of the visual data patterns (e.g., and audio test pattern and a video test pattern), a device may detect the delay between the audio and video test patterns.

However, such existing techniques may use a pre-canned technical pattern sequence (e.g., a QR code) that is not tailored to the stream being captured by a camera. By synthesizing content used to detect audiovisual synchronization, the present disclosure may avoid the need for human operators to be in front of a camera to generate the data patterns, allows for stream-specific synthesized content (e.g., allowing for different synthesized content for different cameras/streams) generated on-the-fly, and allows for improved detection of time delays between video and corresponding audio.

In one or more embodiments, a device may synthesize a natural signal like a talking head, a finger click, a clap, finger snapping, or the like that is easily recognized as a pattern and is repeatable, but is also typical to the content of an expected signal (e.g., talking humans captured by the cameras). One example may include automating a sound engineer's one-two-one-two setup check or drum-hit in a concert venue. A device may synthesize both face, potentially body and voice, sound so they are easily extracted and measured prior to being sent through the signal chain to user devices for presentation. Another benefit is that some existing audiovisual synchronization solutions work on discrete time intervals such as a second, whereas the synthesized signals of the present disclosure may be effectively continuous, allowing for greater precision in correlation. If sync detection fails, the use of natural signals may make it easier for a human to detect sync issues compared an artificial signal.

In one or more embodiments, the synthesized content may be presented on a device (e.g., smart phone, tablet, laptop, etc.) shown to a camera so that the camera may capture the synthesized content from the device as pre-event objects (e.g., objects occurring in the video stream captured by the camera prior to the actual event being captured and televised/streamed). Different devices may present different synthesized content to different respective cameras, and/or some of the cameras may be presented the same synthesized content. The synthesized content may be generated locally on the devices, or generated remotely and provided to the devices for presentation. In this manner, using synthesized content instead of pre-canned content like a QR code may allow for the synthesized content to be tailored to the stream (e.g., using a talking head, clapping, etc.).

In one or more embodiments, the device used to present the synthesized content may be indicated to the device performing the synchronization analysis. Other information that may be provided to the device performing the synchronization analysis may include environmental details (e.g., distance of the device from the camera capturing the synthesized content presented using the device) and/or details of the test sequence, such as a sequence used by the synthesized content (e.g., "the next test will include a 1, 2, clap, clap, test," etc.). This information may be used by the device performing the synchronization analysis to detect whether the audio and video captured in a given video feed from a camera are in sync or not.

In one or more embodiments, a talking head may be configured to say "this is a sound check" or some other easily recognizable audible pattern. Knowing that sequence, a detector can easily align to it, and techniques for audiovisual sync measurement can be used. As the exact timing of the sequence is known, a device can measure the offsets. The start/end may be sent with other signals—such as a finger click. A QR code or similar may be used at the start to indicate the additional presence of a human sequence used as the synthesized content. By synthesizing the human or other content, the pattern for synchronization may be exact, and the synthesized person may convey other information in their dialogue that is easily extracted, such as technical details like "I am speaking from a smartphone today in my tests." A synthesized human (e.g., as opposed to a real person) can make this consistent, repetitive, and continue for hours of checks. The synthesized content may be applied to lab-based device testing. Synthesizing a human for synchronization also may allow a wide range of voice sequences, languages, and patterns of checks. The synthesized content is not limited to a person. For example, an animal or object(s) performing an action having a corresponding sound may be used, such as an animal roaring, an object hitting another object, or the like.

In one or more embodiments, the synthesized synchronization content described herein may be introduced as pre-event objects (e.g., not included in actual broadcasts of the captured audio and visual signals). An intermediate device, such as a broadcast vehicle of equipment, may receive audio and video signals captured by one or multiple cameras. For example, at a sporting event or concert, multiple cameras may provide audio and video feeds from which the audio and video data distributed to user devices may be selected. Any camera may be synchronized or not synchronized at different times, and the delay (e.g., synchronization error) of any camera may differ from the delay of another camera. To allow for correction of out-of-sync audio and video prior to distribution to user devices, a device may detect the synchronization of any of the cameras, including the specific timing delay of any camera, to allow for appropriate timing correction (e.g., synchronization) prior to distribution to user devices. In this manner, synthesized content may be introduced to the audio and video signals of multiple different cameras to detect synchronization issues for respective cameras. When there is a delay between a synthesized head's mouth movement and corresponding speech, or between a snap, clap, tap, or the like and the corresponding sound, such may indicate a timing delay indicative of captured audio and video signals from a camera being out-of-sync. In particular, a delay of about 125 milliseconds may be a threshold for detectability, and the threshold may be asymmetric (e.g., 125 ms behind and 45 ms in front).

There are a variety of ways with which to detect an audiovisual synchronization issue. For example, machine learning models may transform video into discrete audiovisual objects, and localize sources of the sound in video frames to detect the presence of an active speaker or source of sound. Such techniques may be applied to the synthesized video to detect the presence of a synthesized person or object making a sound in video. Phoneme recognition is another way to correlate a lip movement to an expected sound. In particular, classifying facial patterns as visemes that correspond to phonemes may allow for detection of expected sounds at given times in video. Similarity network architectures for machine learning also may be used to learn metrics for face classification. Such techniques may be used to detect the audiovisual synchronization error between synthesized video and audio, although the present disclosure is not intended to be limited to these detection methods.

In one or more embodiments, a set of computer-based tools may be used to generate the synthesized content. For example, a user may create an avatar digitally representing a person to use as the synthesized content. Using a markup language like speech synthesis markup language (SSML) or the like, a user may customize the animations of the synthesized person, such as to have the synthesized person talk, clap, snap, tap their finger, or the like. A user may select a voice of the synthesized person, such as by selecting a speech file and/or customizing the text of the speech file (e.g., what is to be spoken). For a non-speech sound, a user may select a file representing the sound to correspond with the movement of the synthesized person, such as a clapping or snapping sound. Once a synthesized person has been generated along with corresponding audio to represent their speech or a sound for their actions, the synthesized audio and video content may be introduced at the beginning of a pipeline of audio and video signals provided by a camera, or anywhere in the pipeline prior to distributing the audio and video to user devices for presentation. When the pipeline is sent to user devices for presentation, the synthesized content may be removed so that users watching television do not see the synthesized content in their broadcast.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

Figure 1:
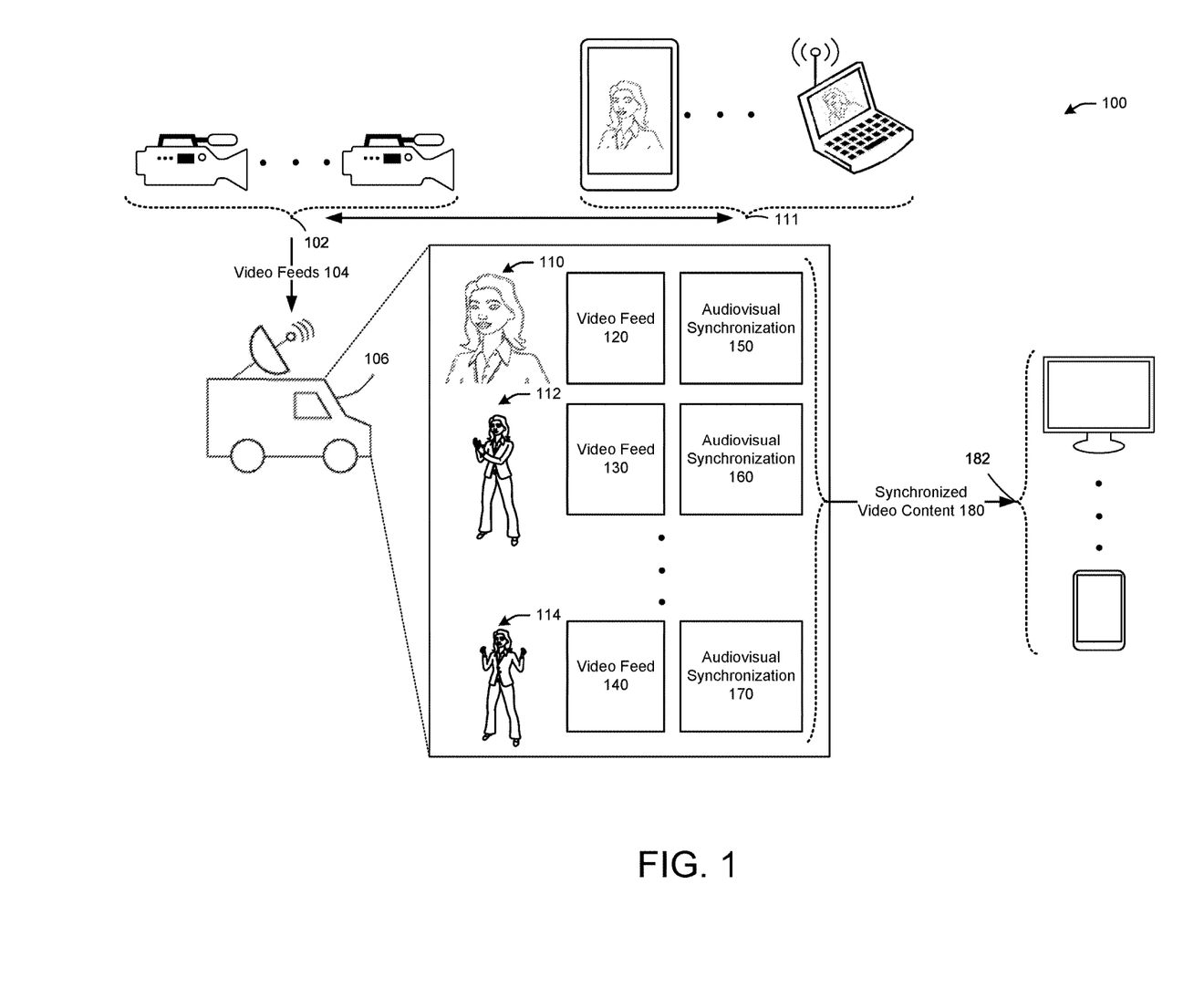
FIG. 1 illustrates an example process for performing audiovisual synchronization using synthesized natural signals, in accordance with one or more example embodiments of the present disclosure.

FIG. 1 illustrates an example process 100 for performing audiovisual synchronization using synthesized natural signals, in accordance with one or more example embodiments of the present disclosure.

Referring to FIG. 1, cameras 102 each may have microphones and may provide respective video feeds 104 (e.g., including captured audio) that may be used to present video content (e.g., OTT or linear television). For example, each of the cameras 102 may be placed at different locations and/or at different vantage points, such as in a stadium for a live sporting event, at a concert venue, or at a studio. Prior to generating and sending the actual video content to user devices for presentation, the video feeds 104 may be sent to an intermediate destination (e.g., a broadcast vehicle 106 or another vehicle, node, or device prior to generating the video content presented to the end user devices). The intermediate destination may analyze (e.g., using the synchronization modules 719 of FIG. 7) any delay between audio and video in any of the video feeds 104 (e.g., the audio/video delay for one feed may be different than the audio/video delay for any other feed, any of which may be zero or non-zero).

Still referring to FIG. 1, to measure the delay between audio and video in any of the video feeds 104, the intermediate destination may rely on synthesized content 110 in any of the video feeds. For example, devices 111 displaying the synthesized content 110 may be positioned/placed in front of a camera (e.g., any of the cameras 102 may capture synthesized content from any of the devices 111 in the camera's field of view) to present the synthesized content to the cameras. The synthesized content 110 (and other synthesized content 112 and 114, which may be the same or different synthesized content as the synthesized content 110) may be pre-event objects (e.g., not included in actual broadcasts of the captured audio and visual signals), and may include both audio and video used to detect whether the audio and video of the synthesized content 110, 112, and/or 114 in a given video feed is synchronized or not. For example, the synthesized content 110, 112, and/or 114 may be introduced as a pre-event object for video feed 120 of the video feeds 104, for video feed 130 of the video feeds 104, and for video feed 140 of the video feeds 104 (any number of cameras and video feeds may be used). For each video feed, the intermediate destination may perform an audiovisual synchronization. For example, audiovisual synchronization 150 may be performed for the video feed 120 with the synthesized content 110, audiovisual synchronization 160 may be performed for the video feed 130 with the synthesized content 110, and audiovisual synchronization 170 may be performed for the video feed 140 with the synthesized content 110. Each of the audiovisual synchronizations 150, 160, 170, etc. may be used to detect and correct any audio/video delay indicated by the synthesized content 110. Once the audio and video of the respective video feeds have been synthesized, the intermediate destination may generate and send synchronized video content 180 to be presented at end user devices 182 (e.g., televisions, smart phones, smart home devices, smart appliances, laptops, tablets, wearable devices, etc.). The synchronized video content 180 may select from the video feeds at different times. For example, the video feed 120 may be included for one time period, the video feed 130 may be included for another time period, and so on, representing different camera shots at different times.

In one or more embodiments, the synthesized content 110, 112, and/or 114 may be presented on a device (e.g., the devices 111) shown to a camera (e.g., the cameras 102) so that the camera may capture the synthesized content from the device as pre-event objects (e.g., objects occurring in the video stream captured by the camera prior to the actual event being captured and televised/streamed). Different devices may present different synthesized content to different respective cameras, and/or some of the cameras may be presented the same synthesized content. The synthesized content 110, 112, and/or 114 may be generated locally on the devices 111, or generated remotely and provided to the devices 111 for presentation. In this manner, using synthesized content instead of pre-canned content like a QR code may allow for the synthesized content 110, 112, and/or 114 to be tailored to the stream (e.g., using a talking head, clapping, etc.).

Figure 7:
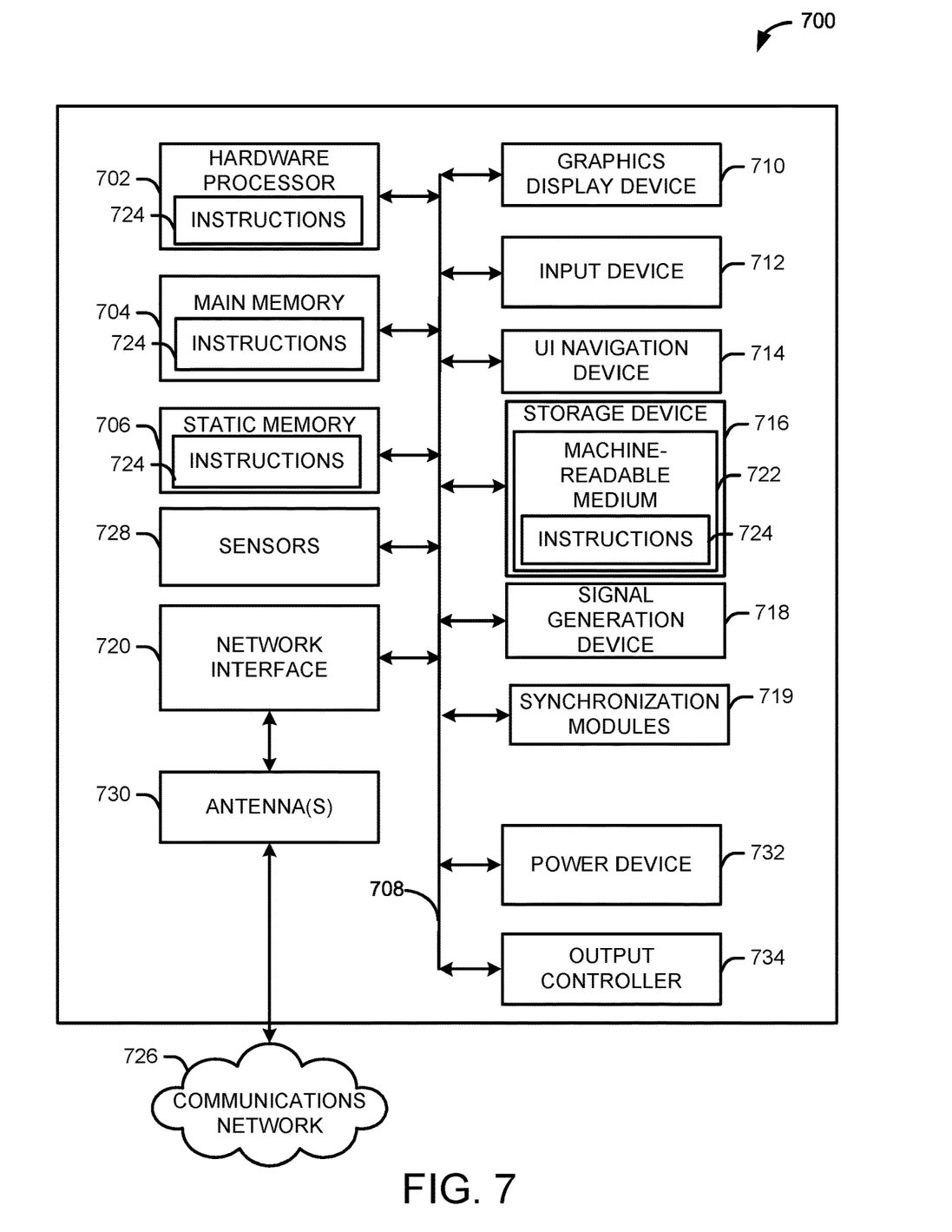
FIG. 7 illustrates a block diagram of an example machine upon which any of one or more techniques (e.g., methods) may be performed, in accordance with one or more example embodiments of the present disclosure.

In one or more embodiments, the devices 111 used to present the synthesized content 110, 112, and/or 114 may be indicated to the device performing the synchronization analysis (e.g., the synchronization modules 719 of FIG. 7). Other information that may be provided to the device performing the synchronization analysis may include environmental details (e.g., distance of the devices 111 from the cameras 102 capturing the synthesized content 110, 112, and/or 114 presented using the devices 111) and/or details of the test sequence, such as a sequence used by the synthesized content. This information may be used by the device performing the synchronization analysis to detect whether the audio and video captured in a given video feed from a camera are in sync or not.

In one or more embodiments, the synthesized content 110, 112, and/or 114 may represent a talking head, a finger click, a clap, finger snapping, or the like that is easily recognized as a pattern and is repeatable, but is also typical to the content of an expected signal (e.g., talking humans). One example may include automating a sound engineer's one-two-one-two setup check or drum-hit in a concert venue. The intermediate destination may synthesize both face, potentially body and voice, sound so they are easily extracted and measured prior to being sent through the signal chain (e.g., the synchronized video content 180) to the user devices 182 for presentation.

In one or more embodiments, the synthesized content 110, 112, and/or 114 may be configured to say or some easily recognizable audible pattern. Knowing that sequence, a detector of the intermediate destination (e.g., the synchronization modules 719 of FIG. 7) can easily align to it, and techniques for audiovisual sync measurement can be used. As the exact timing of the sequence is known, a device can measure the offsets. A synthesized human (e.g., as opposed to a real person) as the synthesized content 110, 112, and/or 114 can make this consistent, repetitive, and continue for hours of checks. The synthesized content 110, 112, and/or 114 may be applied to lab-based device testing. Synthesizing a human for synchronization also may allow a wide range of voice sequences, languages, and patterns of checks.

In one or more embodiments, to allow for correction of out-of-sync audio and video prior to distribution to user devices, a device of the intermediate destination (e.g., the synchronization modules 719 of FIG. 7) may detect the synchronization of any of the cameras 102, including the specific timing delay of any camera, to allow for appropriate timing correction (e.g., synchronization) prior to distribution to the user devices 182. In this manner, the synthesized content 110, 112, and/or 114 may be introduced to the audio and video signals (e.g., the video feeds 104) of multiple different cameras (e.g., the cameras 102) to detect synchronization issues for respective cameras. When there is a delay between a synthesized head's mouth movement and corresponding speech, or between a snap, clap, tap, or the like and the corresponding sound, such may indicate a timing delay indicative of captured audio and video signals from a camera being out-of-sync. In particular, a delay of about 125 milliseconds may be a threshold for detectability.

In one or more embodiments, once the synthesized content 110 has been generated, the synthesized content 110, 112, and/or 114 may be introduced at the beginning of a pipeline of audio and video signals provided by the cameras 102, or anywhere in the pipeline prior to distributing the audio and video to the user devices 182 for presentation. When the pipeline is sent to the user devices 182 for presentation, the synthesized content 110, 112, and/or 114 may be removed so that users watching television do not see the synthesized content 110 in their broadcast.

Figure 2:
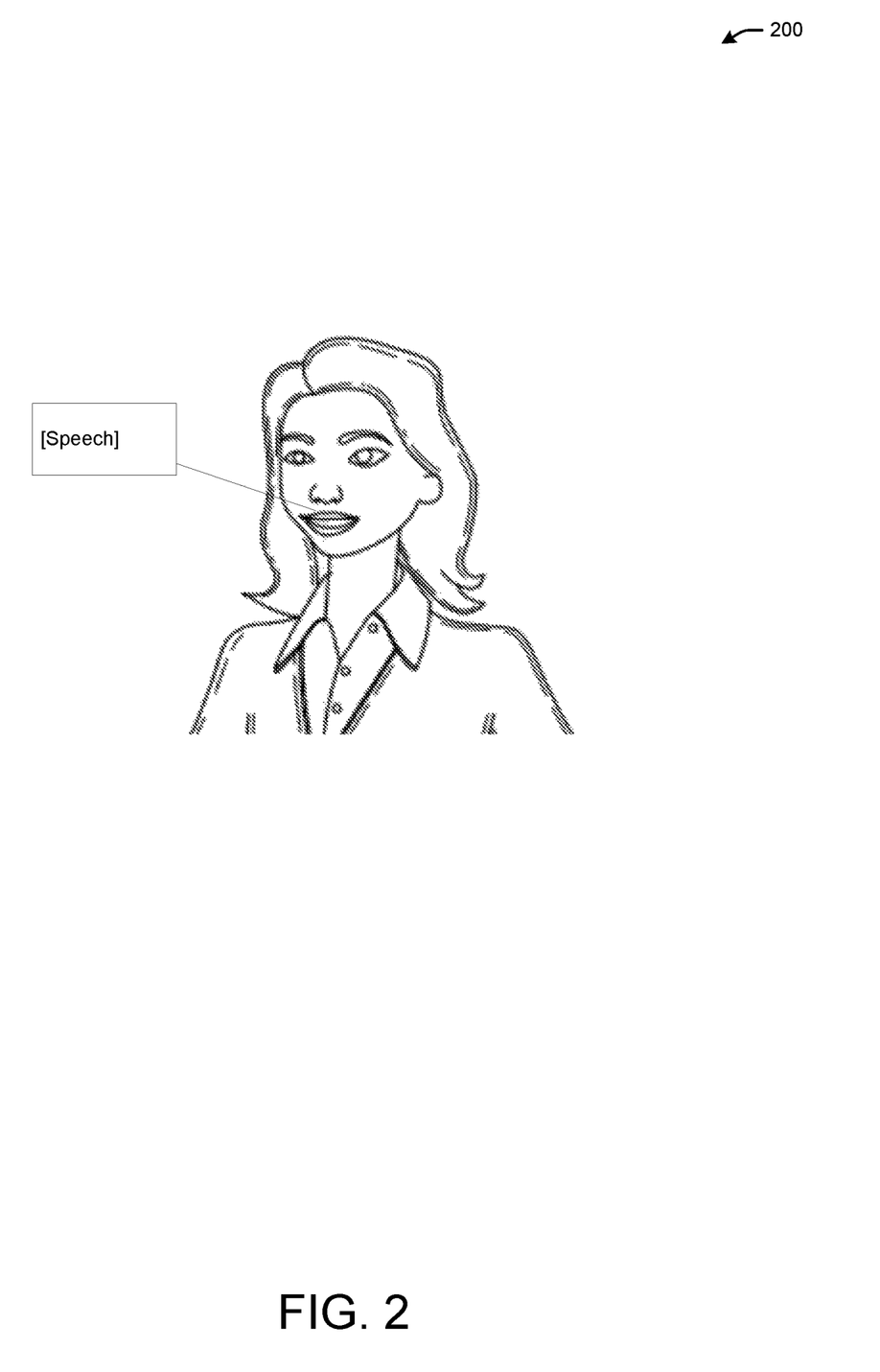
FIG. 2 illustrates example synthesized content used to perform audiovisual synchronization, in accordance with one or more example embodiments of the present disclosure.

FIG. 2 illustrates example synthesized content 200 used to perform audiovisual synchronization, in accordance with one or more example embodiments of the present disclosure.

Referring to FIG. 2, the synthesized content 200 may represent the synthesized content 110 of FIG. 1, and may include a virtual representation of a person's face while speaking. In this manner, the synthesized content 200 may include both video of a virtualized person talking (e.g., lip/mouth movements) and audio corresponding to the sounds of the lip/mouth movements (e.g., phonemes). When there is a delay between the expected phoneme and its lip/mouth movement/position, such may indicate a lack of audiovisual synchronization. The audiovisual synchronizations 150, 160, and/or 170 of FIG. 1 may detect the audiovisual synchronization or lack thereof using a variety of techniques (e.g., described further with respect to FIG. 5).

In one or more embodiments, the synthesized content 200 may be configured to say or some easily recognizable audible pattern. Knowing that sequence, a detector of the intermediate destination (e.g., the synchronization modules 719 of FIG. 7) can easily align to it, and techniques for audiovisual sync measurement can be used. As the exact timing of the sequence is known, a device can measure the offsets. A synthesized human (e.g., as opposed to a real person) as the synthesized content 200 can make this consistent, repetitive, and continue for hours of checks. The synthesized content 200 may be applied to lab-based device testing. Synthesizing a human for synchronization also may allow a wide range of voice sequences, languages, and patterns of checks.

Figure 3:
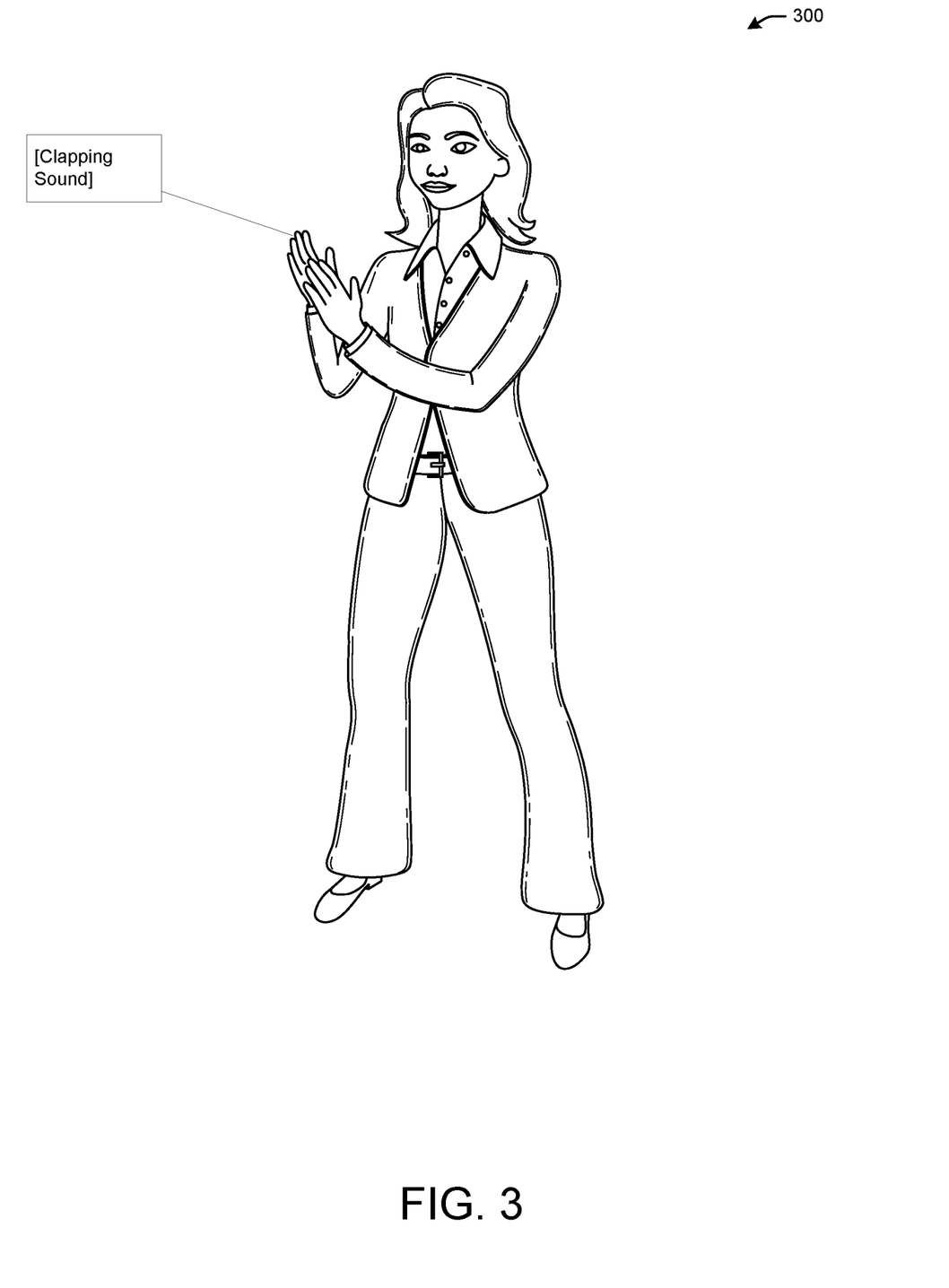
FIG. 3 illustrates example synthesized content used to perform audiovisual synchronization, in accordance with one or more example embodiments of the present disclosure.

FIG. 3 illustrates example synthesized content 300 used to perform audiovisual synchronization, in accordance with one or more example embodiments of the present disclosure.

Referring to FIG. 3, the synthesized content 300 may represent the synthesized content 110 of FIG. 1, and may include a virtual representation of a person clapping. The clapping may represent an easily recognized pattern that is repeatable, but is also typical to the content of an expected signal. A device (e.g., the synchronization modules 719 of FIG. 7) may synthesize both face, potentially body and voice, sound so they are easily extracted and measured prior to being sent through a signal chain to user devices for presentation.

Figure 4:
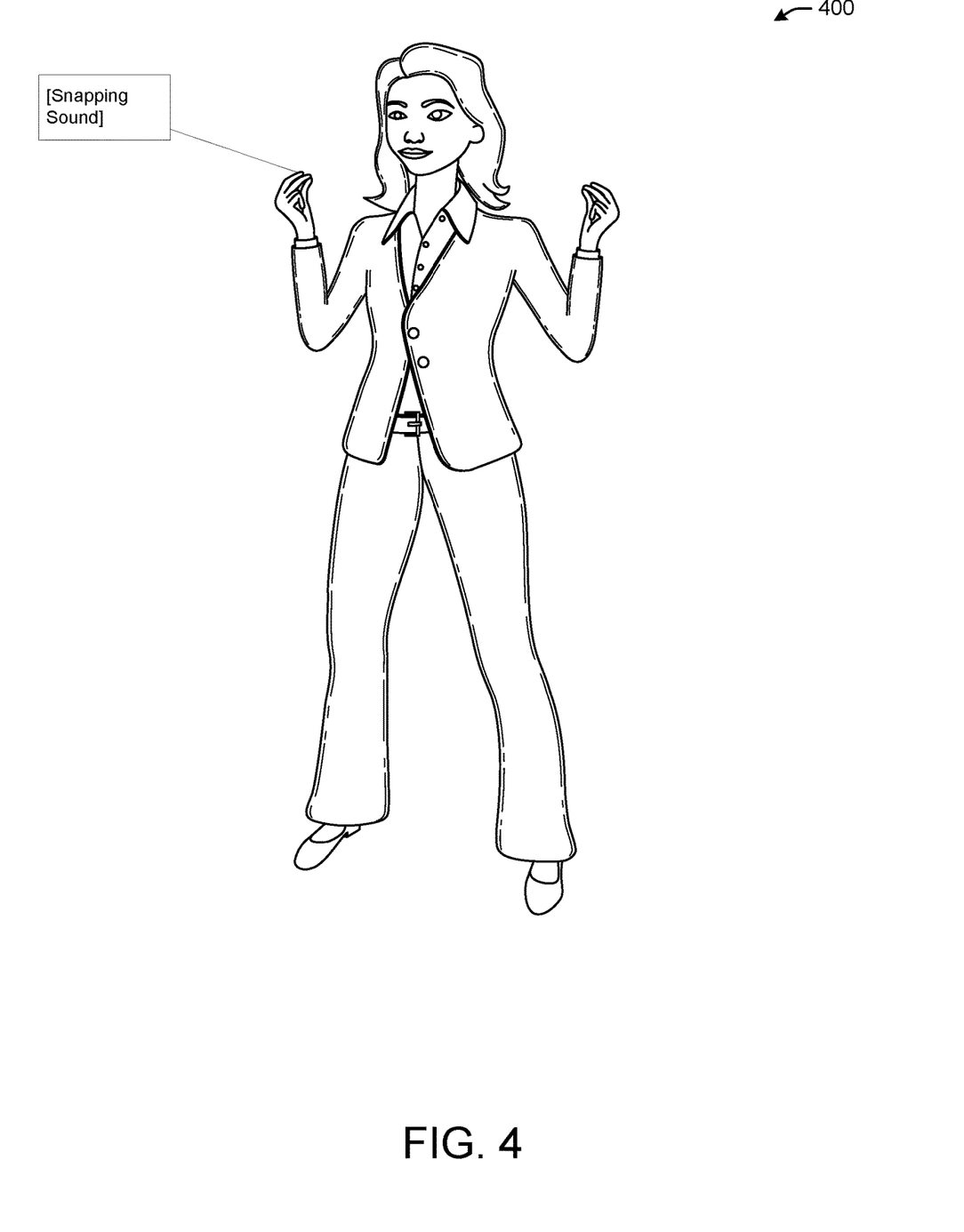
FIG. 4 illustrates example synthesized content used to perform audiovisual synchronization, in accordance with one or more example embodiments of the present disclosure.

FIG. 4 illustrates example synthesized content 400 used to perform audiovisual synchronization, in accordance with one or more example embodiments of the present disclosure.

Referring to FIG. 4, the synthesized content 400 may represent the synthesized content 110 of FIG. 1, and may include a virtual representation of a person snapping. The snapping may represent an easily recognized pattern that is repeatable, but is also typical to the content of an expected signal. A device (e.g., the synchronization modules 719 of FIG. 7) may synthesize both face, potentially body and voice, sound so they are easily extracted and measured prior to being sent through a signal chain to user devices for presentation.

Referring to FIGS. 2-4, the synthesized content 200, 300, 400 may be introduced as pre-event objects (e.g., prior to the video feeds 104 of FIG. 1). To allow for correction of out-of-sync audio and video prior to distribution to user devices, a device (e.g., the synchronization modules 719 of FIG. 7) may detect the synchronization of any of the cameras 102 of FIG. 1, including the specific timing delay of any camera, to allow for appropriate timing correction (e.g., synchronization) prior to distribution to user devices. In this manner, the synthesized content 200, 300, or 400 may be introduced to the audio and video signals of multiple different cameras to detect synchronization issues for respective cameras. When there is a delay between a synthesized head's mouth movement and corresponding speech (e.g., FIG. 2), or between a snap (FIG. 4), a clap (FIG. 3), a tap (e.g., similar to FIGS. 3 and 4), or the like and the corresponding sound, such may indicate a timing delay indicative of captured audio and video signals from a camera being out-of-sync.

Figure 5:
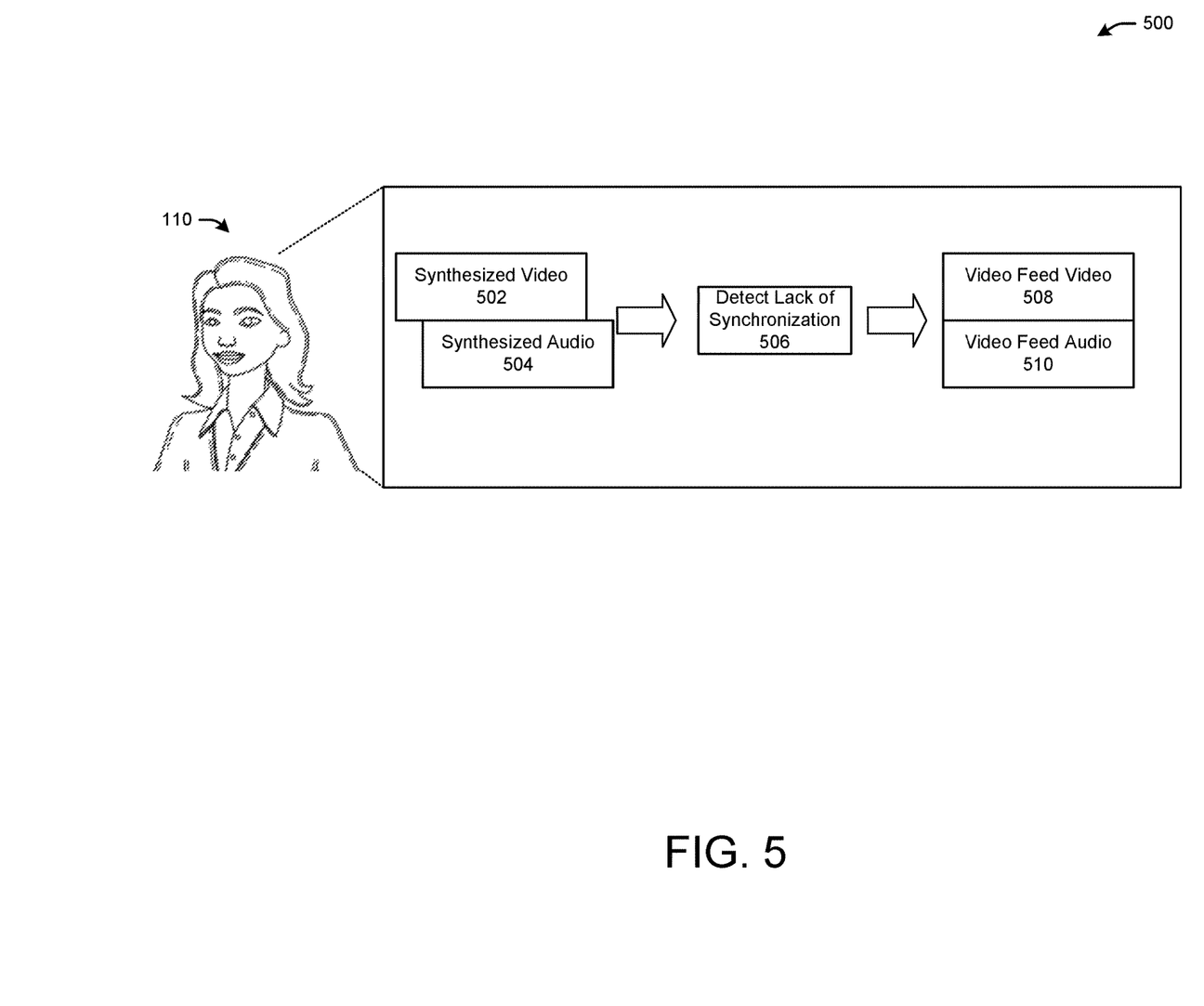
FIG. 5 illustrates an example process for performing audiovisual synchronization using synthesized natural signals, in accordance with one or more example embodiments of the present disclosure.

FIG. 5 illustrates an example process 500 for performing audiovisual synchronization using synthesized natural signals, in accordance with one or more example embodiments of the present disclosure.

Referring to FIG. 5, the synthesized content 110 of FIG. 1 may include both synthesized video 502 and synthesized audio 504. For example, the synthesized video 502 may show a lip/mouth movement corresponding to a virtualized person speaking (e.g., FIG. 2), and the synthesized audio 504 may represent the sounds spoken by the virtualized person. The synthesized video 502 may show a movement corresponding to a virtualized person clapping (e.g., FIG. 3), snapping (FIG. 4), or the like, and the synthesized audio 504 may represent the sounds corresponding to the person's movement/action (e.g., clapping, snapping, tapping sounds, etc.). The synchronization modules 719 of FIG. 7, for example, may detect when there is a time delay between the synthesized video 502 and the synthesized audio 504 (e.g., a lack of synchronization 506). In the example shown in FIG. 5, the synthesized video 502 arrives prior to the synthesized audio 504, but the opposite may occur as well for any of the video feeds 104.

Still referring to FIG. 5, the synchronization modules 719 of FIG. 7 may facilitate generation of a synchronized audio/video feed (e.g., the synchronized video content 180 of FIG. 1) by adjusting any of the video feeds 104 of FIG. 1 to account for the timing delay between the synthesized video 502 and the synthesized audio 504. In this manner, by introducing the synthesized content 110 as a pre-event object in a video feed, audiovisual synchronization for the video feed may be detected and corrected prior to sending the video feed to a user device for presentation. The synchronized audio/video feed may include time-aligned video feed video 508 and video feed audio 510, the alignment based on adjustments to the timing of the audio and/or video of a video feed in response to detected misalignment between the synthesized video 502 and the synthesized audio 504 at the beginning of the video feed.

There are a variety of ways with which to detect an audiovisual synchronization issue. For example, machine learning models may transform video into discrete audiovisual objects, and localize sources of the sound in video frames to detect the presence of an active speaker or source of sound. Such techniques may be applied to the synthesized video to detect the presence of a synthesized person or object making a sound in video. Phoneme recognition is another way to correlate a lip movement to an expected sound. In particular, classifying facial patterns as visemes that correspond to phonemes may allow for detection of expected sounds at given times in video. Similarity network architectures for machine learning also may be used to learn metrics for face classification. Such techniques may be used to detect the audiovisual synchronization error between synthesized video and audio, although the present disclosure is not intended to be limited to these detection methods.

Figure 6:
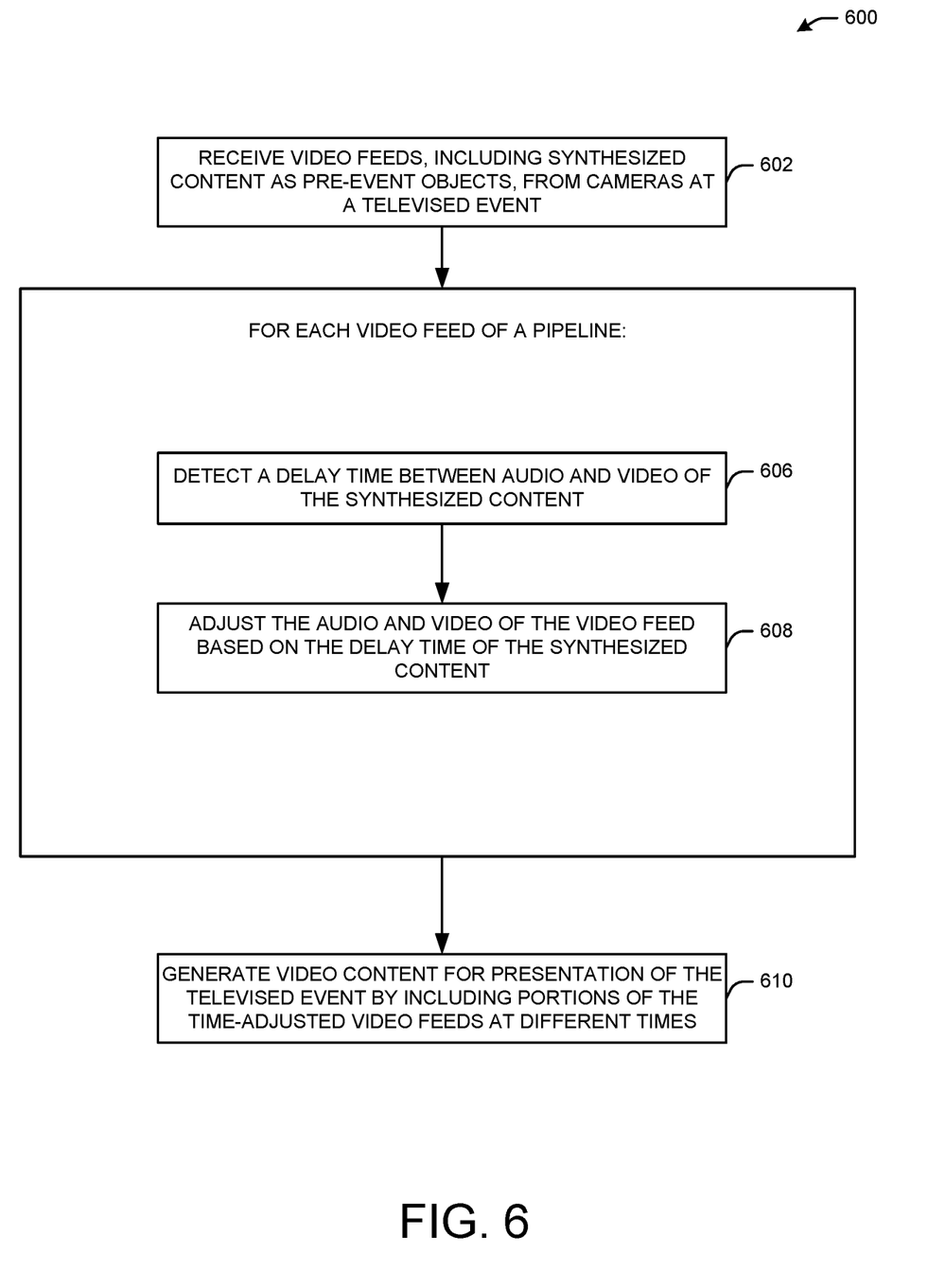
FIG. 6 illustrates a flow diagram of a process for performing audiovisual synchronization using synthesized natural signals, in accordance with one or more example embodiments of the present disclosure.

FIG. 6 illustrates a flow diagram of a process 600 for performing audiovisual synchronization using synthesized natural signals, in accordance with one or more example embodiments of the present disclosure.

At block 602, a device (or system, e.g., the synchronization modules 719 of FIG. 7) may receive video feeds (e.g., the video feeds 104 of FIG. 1) from cameras (e.g., the cameras 102 of FIG. 1) at an event. For example, the cameras may capture different locations and/or fields of view at a stadium, venue, studio, or the like, or multiple different geographic locations. The video feeds may include both video and audio captured by the cameras. The video feeds may include, as pre-event objects, synthesized content (e.g., the synthesized content 110, 112, and/or 114 of FIG. 1, the synthesized content 200 of FIG. 2, the synthesized content 300 of FIG. 3, the synthesized content 400 of FIG. 4) captured by the cameras. Each respective camera may be presented with tailored synthesized content from a device (e.g., the devices 111 of FIG. 1) in the camera's field of view. The synthesized content of any feed (e.g., captured by any camera) may be the same as or different than the synthesized content of any other feed (e.g., captured by any other camera). The synthesized content may show a virtualized representation of a person performing an action having a corresponding sound, such as a person talking, clapping, snapping, tapping, etc. In one or more embodiments, a set of computer-based tools may be used to generate the synthesized content. For example, a user may create an avatar digitally representing a person to use as the synthesized content. Using a markup language like speech synthesis markup language (SSML) or the like, a user may customize the animations of the synthesized person, such as to have the synthesized person talk, clap, snap, tap their finger, or the like. A user may select a voice of the synthesized person, such as by selecting a speech file and/or customizing the text of the speech file (e.g., what is to be spoken). For a non-speech sound, a user may select a file representing the sound to correspond with the movement of the synthesized person, such as a clapping or snapping sound. Once a synthesized person has been generated along with corresponding audio to represent their speech or a sound for their actions, the synthesized audio and video content may be captured by a camera and introduced at the beginning of a pipeline of audio and video signals provided by a camera, or anywhere in the pipeline prior to distributing the audio and video to user devices for presentation. When the pipeline is sent to user devices for presentation, the synthesized content may be removed so that users watching television do not see the synthesized content in their broadcast.

At block 606, the device may, for each video feed in the pipeline, detect a delay time between audio and video of the synthesized content. For example, as shown in FIG. 5, there may be a time delay between the audio and video of the synthesized content that has been inserted into a respective video feed. The time delay for the synthesized content in the respective video feed may be indicative of a time delay between the audio and video in the respective video feed, and may be easier to detect than when analyzing the timing of the audio and video of the video feed as captured by a camera. In this manner, each camera's video feed may have a different time delay, which may be zero or non-zero, and the use of the synthesized content as inserted into each video feed may allow for detecting the respective time delay of the respective video feed. Contextual information also may be provided to the device and used to detect the delay. For example, sequence information (e.g., which actions are being performed, in what order, etc.) along with environmental information and device information (e.g., which of the devices 111 presented the synthesized content to a camera, how far away the device was from the camera when presenting the synthesized content, etc.) may be considered to ensure that the actions and sounds being analyzed for synchronization in the synthesized content are known along with any other useful context.

At block 608, the device may, for each video feed in the pipeline, adjust the audio and video of the video feed based on the time delay as detected in the synthesized content. The time delay may be zero, in which case the audio and video of a video feed may be synchronized and no adjustment may be necessary. However, when the time delay is non-zero (e.g., greater than a non-zero threshold such as 125 milliseconds, at which a viewer may perceive the lack of synchronization), the adjustment may align the video and audio in time.

At block 610, the device may generate and send video content for presentation of the televised event at user devices (e.g., the user devices 182 of FIG. 1). The video content may include portions of the video feeds at different times (e.g., a first video feed from a first camera for a first time, a second video feed from a second camera at a second time, etc.), which may represent different camera shots at a same scene or different scenes. Using the stadium example of a live sporting event, one video feed may be sideline view, another video feed may be an overhead view, another video feed may be a view from an end zone, etc. Each feed should be time-aligned when inserted into the video content for presentation, and the time alignment for each video feed may be based on the time delay of the respective video feed as detected using the synchronization content.

The descriptions herein are not meant to be limiting.

FIG. 7 illustrates a block diagram of an example of a machine 700 (e.g., at the broadcast vehicle 106 or another vehicle, node, or device functioning as an intermediate device between cameras capturing the video feeds and the end user devices who are presented video content from the video feeds, the cameras 102 of FIG. 1) or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. The machine 700 may be a server, a personal computer (PC), a smart home device, a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a tensor processing unit (TPU), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718, one or more synchronization modules 719 (e.g., capable of performing steps according to FIGS. 1-6), a network interface device/transceiver 720 coupled to antenna(s) 730, and one or more sensors 728, such as a microphone. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for using synthesized content to detect audiovisual synchronization in a video pipeline, the method comprising:

receiving, by at least one processor of a first device, a first video feed from a first camera at a first televised event, the first video feed comprising first synthesized content captured by the camera from a second device and preceding the first televised event, the first synthesized content comprising a first virtual representation of a first person performing a first action having a first sound, wherein the first synthesized content is generated based on content of the first televised event;

receiving, by the at least one processor, a second video feed from a second camera at the televised event, the second video feed comprising second synthesized content captured by the camera from a third device and preceding the first televised event, the second synthesized content comprising a second virtual representation of a second person performing a second action having a second sound, wherein the second synthesized content is generated based on the content of the first televised event;

detecting, by the at least one processor, a first delay time between first audio associated with the first sound and first video associated with the first action of the first synthesized content in the first video feed;

detecting, by the at least one processor, a second delay time between second audio associated with the second sound and second video associated with the second action of the second synthesized content in the second video feed;

generating, by the at least one processor, based on the first delay time and the second delay time, time-synchronized audio and video content comprising a first portion of the first video feed for a first time period and a second portion of the second video feed for a second time period; and sending, by the at least one processor, the time-synchronized audio and video content to a fourth device for presentation of the televised event.

2. The method of claim 1, wherein the action is the virtual representation of the person talking, wherein the first delay time is between the person's mouth moving and the first sound of the person in the first video feed, and wherein the second delay time is between the person's mouth moving and the second sound of the person in the second video feed.

3. The method of claim 1, wherein the action is the virtual representation of the person clapping, wherein the first delay time is between the person's hands moving and the first sound of the person in the first video feed, and wherein the second delay time is between the person's hands moving and the second sound of the person in the second video feed.

4. The method of claim 1, wherein the action is the virtual representation of the person snapping, wherein the first delay time is between the person's fingers moving and the first sound of the person in the first video feed, and wherein the second delay time is between the person's fingers moving and the second sound of the person in the second video feed.

5. A method for using synthesized content to detect audiovisual synchronization in a video pipeline, the method comprising:

receiving, by at least one processor of a first device, a first video feed from a first camera at a first televised event, the first video feed comprising synthesized content preceding the first televised event, the synthesized content comprising a virtual representation of an object or being and generated based on content of the first televised event;

detecting, by the at least one processor, a first delay time between audio and video of the synthesized content in the first video feed;

generating, by the at least one processor, based on the first delay time, video content comprising a first portion of the first video feed; and sending, by the at least one processor, the video content to a second device for presentation of the televised event.

6. The method of claim 5, wherein the virtualized representation of the object or being comprises an avatar of a person performing an action that generates a sound, wherein the audio is associated with the sound and the video is associated with the action.

7. The method of claim 6, wherein the action is the virtual representation of the person talking, and wherein the first delay time is between the person's mouth moving and corresponding sound of the person in the first video feed.

8. The method of claim 6, wherein the action is the virtual representation of the person clapping, and wherein the first delay time is between the person's hands moving and corresponding to the sound of the person in the first video feed.

9. The method of claim 6, wherein the action is the virtual representation of the person snapping, and wherein the first delay time is between the person's fingers moving and corresponding to the sound of the person in the first video feed.

10. The method of claim 5, wherein the video content comprises first audio and first video of the first video feed time-synchronized based on the first time delay, the first audio and the first video different than the audio and video of the synthesized content in the first video feed.

11. The method of claim 5, further comprising:

receiving, by the at least one processor, a second video feed from a second camera at the televised event, the second video feed comprising second synthesized content preceding the first televised event, the second synthesized content comprising a second virtual representation of a second object or being; and detecting, by the at least one processor, a second delay time between the audio and the video of the second synthesized content in the second video feed.

12. The method of claim 11, wherein the synthesized content is different than the second synthesized content.

13. The method of claim 11, wherein a first portion of the first video feed is included in the video content for a first time period, wherein the video content further comprises a second portion of the second video feed for a second time period different than the first time period, and wherein the first delay time is different than the second delay time.

14. The method of claim 13, wherein the first portion of the first video feed is time-synchronized based on the first delay time, and wherein the second portion of the second video feed is time-synchronized based on the second delay time.

15. The method of claim 5, wherein the first device is associated with a broadcast vehicle.

16. A system for using synthesized content to detect audiovisual synchronization in a video pipeline, the system comprising at least one processor coupled to memory, the at least one processor configured to:

receive a first video feed from a first camera at a first televised event, the first video feed comprising synthesized content preceding the first televised event, the synthesized content comprising a virtual representation of an object or being and generated based on content of the first televised event;

detect a first delay time between audio and video of the synthesized content in the first video feed;

generate, based on the first delay time, video content comprising a first portion of the first video feed; and send the video content to a second device for presentation of the televised event.

17. The system of claim 16, wherein the virtualized representation of the object or being comprises an avatar of a person performing an action that generates a sound, wherein the audio is associated with the sound and the video is associated with the action.

18. The system of claim 17, wherein the action is the virtual representation of the person talking, and wherein the first delay time is between the person's mouth moving and corresponding to the sound of the person in the first video feed.

19. The system of claim 17, wherein the action is the virtual representation of the person clapping, and wherein the first delay time is between the person's hands moving and corresponding to the sound of the person in the first video feed.

20. The system of claim 17, wherein the action is the virtual representation of the person snapping, and wherein the first delay time is between the person's fingers moving and corresponding to the sound of the person in the first video feed.

* * * * *